United States Patent [19]

Tsuchiya et al.

[11] Patent Number: 4,796,126
[45] Date of Patent: Jan. 3, 1989

[54] MAGNETIC HEAD FLYING SLIDER ASSEMBLY

[75] Inventors: Hiroshi Tsuchiya, Kanagawa; Yoshiakira Karakama, Hadano; Sadanori Nagaike, Odawara; Hiroyasu Nakajima, Odawara; Kousaku Chida, Odawara, all of Japan

[73] Assignee: Computer Basic Research Association, Tokyo, Japan

[21] Appl. No.: 904,818

[22] Filed: Sep. 8, 1986

Related U.S. Application Data

[63] Continuation of Ser. No. 511,589, Jul. 7, 1983, abandoned.

[30] Foreign Application Priority Data

Jul. 9, 1982 [JP] Japan .................. 57-118611

[51] Int. Cl.⁴ .................. G11B 5/60; G11B 5/187
[52] U.S. Cl. .................. 360/103; 360/122
[58] Field of Search .............. 360/113, 122, 103, 102, 360/129, 104

[56] References Cited

U.S. PATENT DOCUMENTS

| | | | |
|---|---|---|---|
| 3,735,052 | 5/1973 | Hoogendoorn et al. | 360/122 |
| 4,130,847 | 12/1978 | Head et al. | 360/122 |
| 4,251,841 | 2/1981 | Jacobs | 360/122 |
| 4,430,440 | 2/1984 | Wada et al. | 360/122 |

OTHER PUBLICATIONS

Bayer et al, Method of Microroughening the $Al_2O_3$/Tic Substrate of Magnetic Sliders, IBM Technical Disclosure Bulletin, vol. 26, No. 7A, Dec. 1983.

W. D. Kehr and R. W. Polleys, Wear-Resistant Coating, Aug. 1976, IBM Technical Disclosure Bulletin, vol. 19, No. 3.

Electronic Design, IBM's Thin Film Heads Squeeze Disk Capacity to Record Levels, Mar. 1, 1980, pp. 60–63.

Primary Examiner—Robert S. Tupper
Assistant Examiner—Andrew L. Sniezek
Attorney, Agent, or Firm—Antonelli, Terry & Wands

[57] ABSTRACT

A thin film magnetic head comprises a flying slider and a thin film transducer. The flying slider is formed as a polygonal body having a first face constituting a flying face and a second face normal to the first face, on which second face the thin film magnetic transducer is formed. The flying slider is made of a material containing $Al_2O_3$-TiC as the main constituent thereof and on the flying face of the slider is formed $Al_2O_3$-$TiO_2$. The flying face exhibits an improved sliding property, while enabling use of the excellent features of $Al_2O_3$-TiC in forming the thin film element as well as in machining the flying slider. The slider can be produced by subjecting the flying face of the slider made of a material containing $Al_2O_3$-TiC to a gas phase reaction with an oxygen containing gas. Alternatively, a portion of the flying face can be removed and a layer of $Al_2O_3$-$TiO_2$ deposited upon the surface of the flying face.

7 Claims, 1 Drawing Sheet

MAGNETIC HEAD FLYING SLIDER ASSEMBLY

This application is a continuation of application Ser. No. 511,589 filed July 7, 1983, now abandoned.

BACKGROUND OF THE INVENTION

1. Field of the Invention

This invention relates to a thin film magnetic head, and more particularly, it relates to a flying slider having good sliding property used for a flying thin film magnetic head which contacts, starts and stops (hereafter merely referred to CSS) with respect to the surface of a magnetic disc.

2. Prior Art

Heretofore, ceramic mixture of $Al_2O_3$ and TiC (hereafter called $Al_2O_3$-TiC) has been used as a material of a flying slider of a thin film magnetic head.

This material is very suitable for machining a work piece thereof into each flying slider with a high degree of accuracy as disclosed in U.S. Pat. No. 4,251,841, but it has a drawback of poor durability in service life.

SUMMARY OF THE INVENTION

As disclosed in ELECTRONIC DESIGN, No. 5, VOL. 28, published on Mar. 1, 1980, thin film magnetic heads were made by the steps of making a bulk magnetic head comprising a substrate and many thin-film head elements integrally formed thereon and subsequently machining the bulk magnetic head or head element through workings such as cutting, grinding and polishing into each discrete flying slider which carries an integrally formed thin film element on its one end face.

Accordingly, the flying slider is formed as a polygonal body comprising a first face which constitutes a flying face and a second face normal to the flying face at its one end, on which second face are formed the thin film element i.e. thin film magnetic transducer. Flying sliders of this kind is required to fly stably even in a narrow flying space to attain high recording density. Accordingly, it is necessary to satisfy various strict requirements on flatness, surface roughness, non-breakage on the edge of the flying face, accuracy of the width of the flying face and so forth. As can be clearly understood from the above explanation, it is required that a material for making a flying slider of a thin film magnetic head be able to withstand machining or forming in the steps of manufacture. In addition, it must be worked with a high degree of accuracy. As one material satisfying such requirements, a mixture of $Al_2O_3$-TiC has been proposed by U.S. Pat. No. 4,251,841 and is being practically used. As a result of the evaluation test by the inventors of this invention, indeed, it was found that said material is satisfactory in forming thin film elements and in machining into floating sliders, but it was found that there were drabacks of poor sliding performance and insufficient number of times regarding CSS endurance characteristics. Necessary endurance number of times regarding CSS varies depending upon the manner in which the magnetic disc device is used. If it is used four times per day, it must endure about 15,000 times in ten years, and when the variation in the condition of using is considered, endurance number of times must be above 30,000 times. Endurance number of times as to the conventional $Al_2O_3$-TiC material in cooperation with a magnetic disc of a standard type is found to be 5,000–15,000 as the results of CSS test which value is only one-sixth to one-half of the desired value of the endurance number of times and must be improved.

The endurance number of times regarding CSS can be largely extended by increasing the amount of lubricant applied to the surface of the magnetic disc. However, such increased amount of lubricant is liable to cause adhesion between the surface of magnetic disc and the flying slider at the time of starting, which often results in breakage of the magnetic heads, and it was found difficult to apply. Meanwhile, the inventors of the present invention have discovered that an $Al_2O_3$-$TiO_2$ material, which is similar to $Al_2O_3$-TiC in properties has been used as wear resistant protective layer of a head for magnetic tape, is superior in the endurance number of times regarding CSS characteristics and has 100,000 times or more in the value of the endurance number of times in the CSS test in which a flying slider made of the $Al_2O_3$-$TiO_2$ material is tested. But, it was also found that this material showed large extent of deformation during the formation of thin film elements by machining or shaping into each flying slider and showed poor flatness of the finished sliders, and that this material was not acceptable for the material of the flying sliders to be used for high recording density devices. The reason for the poor performance of the $Al_2O_3$-$TiO_2$ material seems to reside in the considerably lower rigidity and lower hardness of the material as shown by its lower micro Vickers hardness of about 1,200 in value in comparison with the high rigidity and high hardness of the $Al_2O_3$-TiC material represented by its micro Vickers hardness over 2,000 in value.

As explained above, since both materials $Al_2O_3$-TiC and $Al_2O_3$-$TiO_2$ were not satisfactory for making flying sliders of thin film magnetic haads, the inventors have aimed to develop a novel flying slider or sliders by use of only the advantageous features of these two materials.

Distinguishable features of the present invention reside in that at least a part of the surface layer in a flying slider made of $Al_2O_3$-TiC material is made to contain $TiO_2$, whereby the endurance number of times regarding CSS characteristics of the $Al_2O_3$-TiC material can be improved while making best use of the excellent feature of the $Al_2O_3$-TiC in forming this material into thin film element and in machining for making each discrete flying slider.

An object of the present invention is to provide a thin film magnetic head comprising a floating slider having excellent sliding property.

Another object of the present invention is to provide a thin film magnetic head having a flying slider in which the thin film element can be readily formed, the machinability thereof being superior and the sliding property thereof being also superior.

Further object of the present invention is to provide a method of substituting at least a part of the material of the flying face in a flying slider with another material having better sliding property.

Still further object of the present invention is to provide a method which provides, at least on a part of the flying face of a flying slider, a substance having superior sliding property.

BRIEF DESCRIPTION OF THE DRAWINGS

FIG. 2a is a perspective view of a flying slider of a preferred embodiment of the present invention; and FIG. 2b is a partly enlarged perspective view of the part shown by a circle in FIG. 2a.

DESCRIPTION OF THE PREFERRED EMBODIMENTS

EXAMPLE - 1

Figure 1:
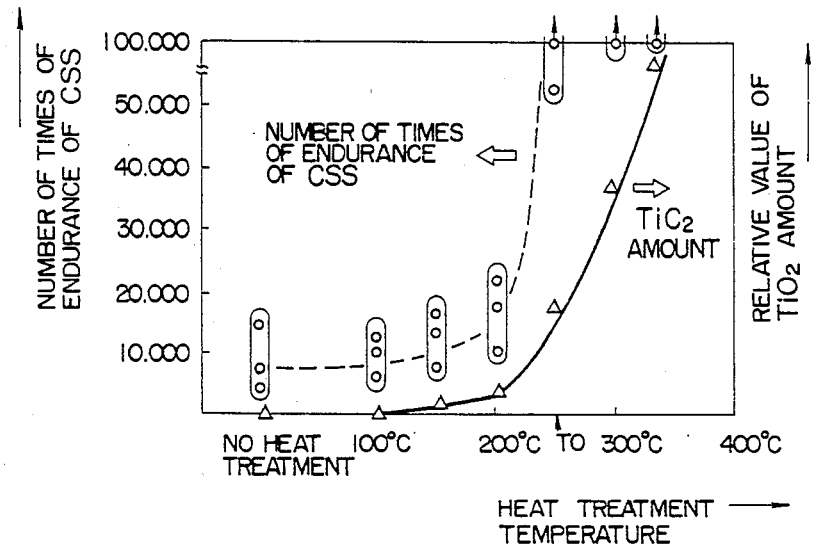
FIG. 1 is a graph showing the effect of heat treatment in atmospheric air with respect to the endurance number of times of CSS characteristics of $Al_2O_3$-TiC material and with respect to the amount of resultant $TiO_2$.

It was found that, by heat treating $Al_2O_3$-TiC material in an atmospheric air, TiC in the material is converted into $TiO_2$ and that the degree of such conversion varies in dependence upon the temperature of the heat treatment. FIG. 1 shows an example of the tests. The ordinate of the graph of FIG. 1 indicates both the endurance number of times of CSS and the amount of converted $TiO_2$ at various heat temperatures shown on abscissa at which temperature test samples have been held in a heating furnace for one hour. It can be seen from the graph that, in the test samples, TiC has rapidly converted into $TiO_2$ at test temperatures above 250° C. due to chemical reaction with oxygen in the atmospheric air. As the chemical reaction proceeds, the endurance number of times of CSS has also been rapidly improved to satisfy the aimed value of more than 30,000 times when they were heated at the temperatures above 250° C. The critical temperature (To) above which CSS characteristics can be improved varies in dependence upon the ratio of $Al_2O_3$ to TiC in the starting material and the amount of additives, but it was observed that the temperature T effective for improving CSS characteristics lies within a range of 200°-400° C. Moreover, since this heat treatment is effected on finally shaped flying sliders each of which has already been provided thereon with thin film magnetic element, heating at a temperature above 400° C. causes the commencement of deterioration of the thin film element and/or deformation of the flying face. In this respect, it is desired to select such an material as having a temperature (To) for enabling the improvement of CSS characteristics below 400° C. In addition, it was also observed through the analysis that the $TiO_2$ layer formed through the heat treatment distributes only adjacent to the surface of the flying slider and the inner structure of the flying slider as a whole is still maintained as $Al_2O_3$-TiC as it was in the starting material without being lowered in rigidity nor being impaired in stability in shape.

EXAMPLE - 2

If the finally shaped flying slider(s) described in Example 1 are heat treated in a heating furnace, since not only the body of the flying slider but also the thin film formed thereon are also subjected to heating, there is caused a problem of the deterioration of the thin film element when the heat treatment temperature is relatively high.

As a measure to improve the problem of deterioration due to the heating, the inventors used an oxygen plasma ashing means so as to subject the flying slider to an ashing treatment of 30 minutes by heating the substrate at 100° C. with 200 W, as the result, heating effect similar to that obtained by Example - 1 was obtained. In this Example, partial and effective conversion into $TiO_2$ has been performed without unnecessarily heating up the entire body of the flying slider, whereby it was able to widen the allowable temperature range capable of preventing deterioration of the thin film element.

EXAMPLE - 3

Use of atmospheric ashing means instead of the oxygen plasma ashing means in Example-2 has resulted in similar good effect.

EXAMPLE - 4

Heating of the flying slider by a laser heating device in the air in place of the oxygen plasma ashing means in the Example-2 also brought about a similar effect.

EXAMPLE - 5

An electron beam heating means instead of the laser heating device in Example - 4 also accomplished similar effect.

EXAMPLE - 6

In this Example a high frequency induction heater was used in lieu of the laser heating device of the Example-4, and it was proved to be effective equally thereto.

It was confirmed through Examples 2 to 6 that the surface of the flying sliders, subjected to gas phase reaction with oxygen containing gas while the surface thereof is in a heated condition, also can be provided with aimed desired effect.

EXAMPLE - 7

Figure 2:
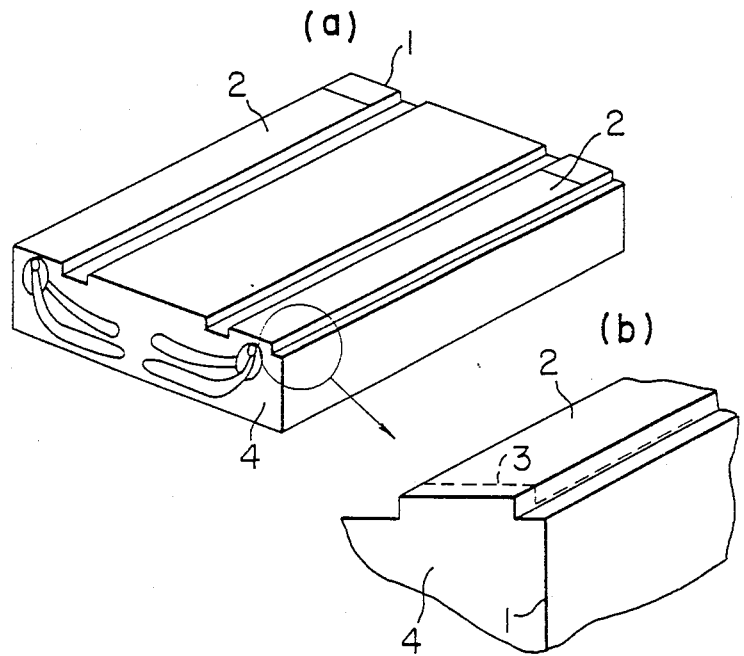

A flying slider manufactured according to this Example is shown in FIGS. 2a and 2b. FIG. 2a shows the overall configuration of the slider and FIG. 2b is a partial enlarged view. As shown in FIG. 2b, after having machined into a flying slider 1, the flying surface 2 except for the marginal portion having a width of about 10 to 100 micron meter adjacent to the end face 4 carrying thereon an integrally formed thin film element i.e. thin film magnetic transducer is removed by means of machining, spatter etching, or ion milling by a depth of 2 to 100 micron meter as shown by the dotted line 3. Then a layer of $Al_2O_3$-$TiO_2$ is deposited, on the entire surface of the flying slider which has previously been cut away, by using well known plasma spraying technique, subsequently the deposited layer being subjected to surface grinding until it is levelled to the initial surface line defined before machining as shown by the dotted line 3. By this re-arrangement of the surface strutture of the flying slider, it becomes possible to provide the $Al_2O_3$-$TiO_2$ material upon almost all of the surface portion of the flying slider on which surface portion the CSS operations are effected, with the result that the endurance number of times regarding CSS characteristics can be improved.

EXAMPLE - 8

Sputtering of $Al_2O_3$-$TiO_2$ was applied by using the target of same material instead of plasma spraying adopted in Example-7 together with similar surface grinding, as the result, CSS characteristics could be also improved.

The composite structure comprising surface film of $Al_2O_3$-$TiO_2$ formed on the substrate of $Al_2O_3$-TiC a shown in Examples 7 and 8 has such features that the difference in physical properties, such as coefficient of thermal expansion and heat conductivity between the above two substances is relatively small and that such composite structure has good stability against change caused by the lapse of time.

EXAMPLE - 9

Ion plating or evaporation were applied in lieu of the sputtering as done in Example-8 and it was proved to be equally effective.

EXAMPLE - 10

It was also confirmed that addition of other third element or elements to the basic $Al_2O_3$-TiC, with an intention to improve sintering ability and to increase machinability in cutting, is similarly effective.

Advantageous Effect of the Invention

As can be seen from the several examples of the invention described above, according to the present invention, it becomes possible to obtain an improved substrate for thin film magnetic head, which substrate also functions as a flying slider, superior with respect to all of the points of the provision of a thin film element, the formability with high precision into the flying slider, and the sliding characteristics.

It will be apparent from the foregoing description on the several examples, that the thin film magnetic head of the present invention may include various kind of magnetic heads, which are produced through thin film process followed by high precision machining and are adapted to effect flying action, such as magnetoresistive thin film magnetic heads, vertical recording type thin film magnetic heads, etc.

We claim:

1. A thin film magnetic head comprising: a polygonal substrate member having a first face constituting a slider flying face and a second face extending vertically to said first face at the end of said first face; and a thin film magnetic element formed on said second face of said substrate member; wherein at least a part of said first face of said substrate member is made to have a chemical composition different from that of the substrate so that the flying face has superior contact-start-stop-endurance characteristics; said substrate member containing $Al_2O_3$-TiC as the main constituent thereof and at least a part of such first face comprising a layer of $Al_2O_3$-$TiO_2$.

2. A thin film magnetic head according to claim 1, wherein said first face comprises a layer of $Al_2O_3$-$TiO_2$ formed by reacting $Al_2O_3$-TiC with oxygen at a temperature within a range of 200°C.-400° C.

3. A thin film magnetic head according to claim 1, wherein said first face comprises a layer of $Al_2O_3$-$TiO_2$ formed by subjecting said first face to an oxygen plasma ashing treatment.

4. A thin film magnetic head according to claim 1, wherein said first face comprises a layer of $Al_2O_3$-$TiO_2$ formed by heating said first face with a laser beam in the presence of oxygen.

5. A thin film magnetic head according to claim 1, wherein said first face comprises a layer of $Al_2O_3$-$TiO_2$ formed by heating said first face with an electron beam in the presence of oxygen.

6. A thin film magnetic head according to claim 1, wherein said first face comprises a layer of $Al_2O_3$-$TiO_2$ formed by heating said first face with a high frequency induction heater in the presence of oxygen.

7. A thin film magnetic head according to claim 1, wherein said first face comprises a layer of $Al_2O_3$-$TiO_2$ formed by removing a portion of said first face and depositing a layer of $Al_2O_3$-$TiO_2$ on the surface of said substrate member where said portion was removed.

* * * * *

UNITED STATES PATENT AND TRADEMARK OFFICE
CERTIFICATE OF CORRECTION

PATENT NO. : 4,796,126

DATED : January 3, 1989

INVENTOR(S) : Hiroshi TSUCHIYA, ET AL

It is certified that error appears in the above-identified patent and that said Letters Patent is hereby corrected as shown below:

On the face of the patent, in the left-hand column thereof, delete

"[73] Assignee: Computer Basic Research Association, Tokyo, Japan"

and substitute therefor the following:

-- [73] Assignee: Computer Basic Technology Research Association, Tokyo, Japan --

Signed and Sealed this

Fourteenth Day of November, 1989

*Attest:*

JEFFREY M. SAMUELS

*Attesting Officer*   *Acting Commissioner of Patents and Trademarks*